Patented July 17, 1951

2,560,584

UNITED STATES PATENT OFFICE 2,560,584

N-CARBOANHYDRIDES

Robert Neal MacDonald, New Castle, Del., assignor to E. I. du Pont de Nemours and Company, Wilmington, Del., a corporation of Delaware No Drawing. Application February 2, 1949,
Serial No. 74,241

18 Claims. (Cl. 260—307)

This invention relates to new types of polyamides and the intermediates therefor, and more particularly to N-carboanhydrides of alpha-amino acids of unusual ring structure and the polymers derived therefrom.

This application is a continuation in part of my copending applications Serial No. 766,458, filed August 5, 1947, now abandoned, and Serial No. 778,458, filed October 7, 1947.

This invention has as an object the preparation of new organic compounds. A further object is the preparation of new intermediates for condensation polymers. Another object is the preparation of new polymers, including copolymers. Other objects will appear hereinafter.

These objects are accomplished by the following invention of N-carboanhydrides of alpha-amino acids wherein the carbon between the amino nitrogen and the acyl carbon is a spiro carbon, i. e., the carbon forms the one common member of two rings—one being the N-carboanhydride ring.

These N-carboanhydrides may be prepared by the reaction of the alpha-amino acid having the alpha carbon a member of a ring with ethyl chloroformate, then reacting the carboethoxy derivative with thionyl chloride to form the corresponding acid chloride which splits out ethyl chloride to yield the desired product. However, the route through the carbobenzyloxy derivative is preferred because of greater ease of handling and greater reaction efficiency. They may also be prepared by reacting the amino acid salt with phosgene.

The invention is illustrated by the following examples but the invention is not limited to these particular modifications.

EXAMPLE I

A. *Preparation of 5,5-tetramethylenespirohydantoin*

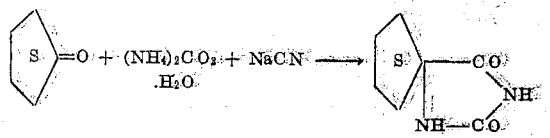

is prepared, by the method of Henze and Speer, J. Am. Chem. Soc., 64 522-3 (1942) as follows:

In a five-liter, round-bottomed, three-necked flask equipped with a reflux condenser, a thermometer, a mechanical stirrer, and a dropping funnel, a mixture of 260.4 g. (3.1 moles) of cyclopentanone, 684 g. (6 moles) of ammonium carbonate monohydrate, 900 mls. of 95% ethyl alcohol, and 600 mls. of water are heated to 54° C. in a water bath. As the substance is vigorously agitated and heated at 54-60° C., a solution of 153 g. (3 moles) of 96% sodium cyanide in 450 mls. of water is added dropwise over a period of one hour. Stirring is continued at 57-60° C. for three hours, and the temperature is then raised to 90° C. for 15 minutes to destroy any excess ammonium carbonate. The reaction mixture is then transferred to a four-liter beaker and concentrated on a steam bath to about three-fourths its volume. Upon cooling, a snow white precipitate separates out which is filtered, washed with water, then with alcohol, and air dried. There is thus obtained 285 g. of 5,5-tetramethylenespirohydantoin melting at 204-206° C. (compared to 204-205° C. as given in the reference above). On concentrating the mother liquor and cooling in ice, there is obtained an additional 56 g. of product melting at 205-206° C. The total yield of relatively pure hydantoin is 341 g. (74% of theory). On recrystallization from 1800 mls. of boiling absolute alcohol, there is obtained 258.4 g. (56% of theory) of glistening white platelets melting at 205.4-206.1° C.

ANALYSIS

Calculated for $C_7H_{10}O_2N_2$: C, 54.53%; H, 6.54%; N, 18.17%.
Found:
C, 54.50%; H, 6.90%; N, 17.93%
50.04%; 6.79%; 17.93%

B. *Preparation of 1-aminocyclopentanecarboxylic acid*

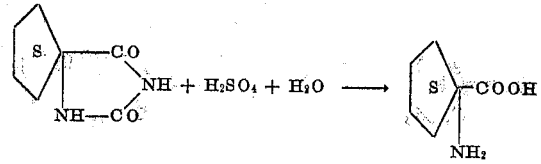

In a one-liter, round-bottom flask, 196.5 g. (1.27 moles) of 5,5-tetramethylenespirohydantoin is refluxed in 604 g. (3.7 moles) of 60% sulfuric acid under nitrogen for three days. The light amber, hot solution is transferred to a beaker and cooled in ice to give an almost solid cake of amino acid sulfate, which is filtered through a sintered glass funnel to remove most of the excess sulfuric acid. The solid is taken up in 300 mls. of warm water, treated with decolorizing charcoal, and the solution neutralized with a slight excess of ammonium hydroxide to give a snow white crystalline precipitate of 1-aminocyclopentanecarboxylic acid. The product is washed with 65 mls. of water in portions, after which only a very faint sulfate test is given by the wash water. After being dried for two days at 65° C., the product weighs 75.6 g. (46% of theory).

ANALYSIS

Calculated for $C_6H_{11}O_2N$: C, 55.79%; H, 8.59%; N, 10.85%; neutral equivalent (N. E.), 129.16
Found:
C, 55.90%; H, 8.59%; N, 10.72%; N. E., 128.4
C, 55.57%; H, 8.67%; N, 10.69%; N. E., 128.0

1-aminocyclopentanecarboxylic acid may also be prepared by the method of Zelinsky et al., J. Russ. Phys. Chem. Soc., 43 1097.

C. N-carboanhydride of 1-aminocyclopentanecarboxylic acid

In a 500 ml. round-bottomed, four-necked flask equipped with a thermometer, a phosgene inlet tube, a mechanical stirrer, and a condenser open to the atmosphere only through a drying tube, a slurry of 25.8 g. (0.2 mole) of 1-aminocyclopentanecarboxylic acid in 250 mls. of purified, dry dioxane is stirred vigorously at 90° C. as phosgene is passed in for 30 minutes at a rate of 0.01 mole per minute [representing 0.3 mole total, 50% excess over theory]. The system is stirred at 90° C. for an additional 30 minutes and then pressure filtered under anhydrous conditions with nitrogen through a sintered glass funnel into a distilling flask. There is thus obtained on the filter 15.8 grams (47.5% recovery based on the amino acid) of 1-aminocyclopentanecarboxylic acid hydrochloride.

The filtrate is concentrated in the distilling flask under reduced pressure of the water pump at 55° C. until the volume is reduced to about 50 mls., whereupon it is transferred to an Erlenmeyer flask and 400 mls. of petroleum ether added. The oil that separates out crystallizes rapidly upon cooling. The precipitate is filtered and rinsed with petroleum ether in a nitrogen dry box (i. e., in a closed space under anhydrous conditions and also under a positive pressure of nitrogen) to give 14.4 g. (89% of theory) of slightly colored crystalline product. This material is treated with decolorizing charcoal in 140 mls. of warm benzene, filtered hot, and 100 mls. of warm petroleum ether added. A voluminous, white precipitate is formed which is removed by filtration and then recrystallized from 100 mls. of warm benzene. There is thus obtained 9.9 g. (60% of theory) of the N-carboanhydride of 1-aminocyclopentanecarboxylic acid as snow white, tiny needles melting at 128° C.

ANALYSIS

Calculated for $C_7H_9O_3N$: C, 54.19%; H, 5.85%; N, 9.03%
Found: C, 54.17%; H, 5.86%; N, 9.08%

EXAMPLE II

A. Preparation of 5,5-pentamethylenespirohydantoin

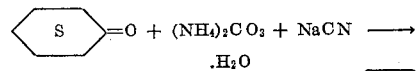

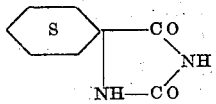

This preparation is carried out in general by the method of Bucherer and Lieb, J. prakt. Chem. [2], 141 5 (1934), and is described under Example I, Part A, except that 308.7 g. (3.15 moles) of redistilled cyclohexanone are used and the heating time at 90° C. is one-half hour. After cooling the reaction mixture, the resulting precipitate is filtered and washed with three liters of ice-cold distilled water. There is thus obtained 330 grams (60% of theory) of 5,5-pentamethylenespirohydantoin as snow white, glistening crystals melting sharply at 216° C.

ANALYSIS

Calculated for $C_8H_{12}O_2N_2$: C, 57.13%; H, 7.14%; N, 16.66%
Found:
C, 57.23%; H, 7.27%; N, 16.50%
C, 57.25%; H, 7.04%; N, 16.31%

B. Preparation of 1-aminocyclohexanecarboxylic acid

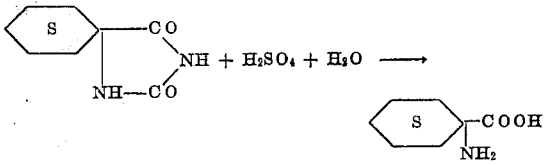

This preparation is carried out in general in the same fashion as described previously in Example I, Part B, except that 252 g. (1.5 moles) of 5,5-pentamethylenespirohydantoin and 705 g. (4.3 moles) of 60% sulfuric acid is used and the refluxing time under nitrogen is 48 hours. The solid cake obtained on cooling is not filtered from the acid mixture but is dissolved in 1,000 mls. of distilled water on a steam bath and neutralized with concentrated sodium hydroxide. The reaction mixture is then cooled and the product removed by filtration, washed with 2 liters of distilled water and finally dried in a vacuum desiccator. There is thus obtained 130 g. (66% of theory) of 1-aminocyclohexane carboxylic acid as glistening, snow white crystals.

ANALYSIS

Calculated for $C_7H_{13}O_2N$: N. E., 143.2
Found: N. E., 143.8 and 143.9

C. Preparation of N-carbobenzyloxy-1-aminocyclohexanecarboxylic acid

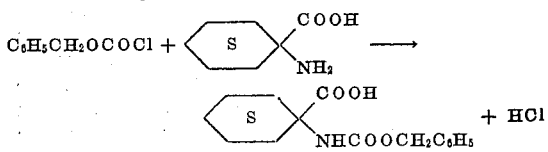

In a one-liter, three-necked flask equipped with a stirrer and two dropping funnels are placed 71.6 g. (0.5 mole) of 1-aminocyclohexanecarboxylic acid and 245 mls. (0.5 mole) of 2.038 N sodium hydroxide. While cooling this solution in an ice bath and continuously stirring it, 107.7 g. (0.5 mole) of carbobenzyloxychloride and 122.7 mls. (0.5 mole) of 4.076 N sodium hydroxide are added simultaneously from the two dropping funnels over a period of one hour. The acid chloride addition is started slightly ahead of that of the sodium hydroxide, the rates being adjusted so that the addition of both ends together. Stirring at ice-bath temperature is continued for two hours, after which the reaction mixture is filtered and the filtrate extracted four times with ether. While kept at 0° C. by external cooling, the solution is neutralized with 49 mls. of concentrated hydrochloric acid, whereupon a white precipitate forms. It is separated by filtration, washed with cold distilled water until free from chloride ion, and dried over calcium chloride in a vacuum desiccator. N-carbobenzyloxy-1-aminocyclohexanecarboxylic acid, melting at 154.8–156° C., is thus obtained, 72.7 g. or 52% of theory.

ANALYSIS

Calculated for $C_{15}H_{19}NO_4$; N. E., 277.3
Found: N. E., 275.4, 276.4

D. *Preparation of the N-carboanhydride of 1-aminocyclohexanecarboxylic acid*

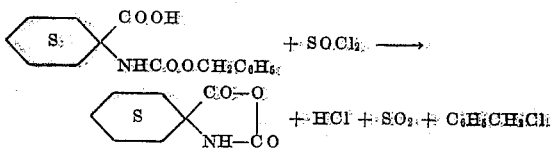

Fifty g. (0.181 mole) of N-carbobenzyloxy-1-aminocyclohexanecarboxylic acid is mixed at room temperature with 119 g. (one mole) of thionyl chloride in a 200 ml. distilling flask protected with tubes containing a drier. Evolution of sulfur dioxide and hydrogen chloride begins within one minute, and solution is complete within ten minutes. The reaction mixture is allowed to stand overnight, after which it is still a clear, amber color. The excess thionyl chloride is removed under reduced pressure, leaving a solid product. This crude material is washed with petroleum ether in a Büchner funnel under anhydrous conditions, 27 g. (88.5% of theory) of the N-carboanhydride of 1-aminocyclohexanecarboxylic acid being thus obtained. If a purer product is desired, it may be taken up in 60 mls. of boiling methylene chloride, treated with decolorizing charcoal at the boil, filtered hot, 50 mls. of petroleum ether added, and the resulting solution cooled at Dry-Ice temperature overnight. The crystalline product is then filtered off, washed first with a mixture of four parts petroleum ether to one part methylene chloride by volume, and washed finally with petroleum ether alone. After drying, 17.1 g. (56% of theory) of snow white crystals melting sharply at 114.8–115.2° C. is obtained.

ANALYSIS

Calculated for $C_8H_{11}NO_3$: C, 56.79%; H, 6.55%; N, 8.28%.
Found: C, 57.09%; H, 6.66%; N, 8.20%.

E. *1-aminocyclohexanecarboxylic acid N-carboanhydride as a blowing agent for sponge rubber*

Fifty (50) parts of pale crepe rubber (Williams plasticity index No. 90) is thoroughly broken down by milling for 20 minutes on a rubber mill at room temperature. A mixture of 2.5 parts of zinc oxide, 2.5 parts of stearic acid, 25 parts of Camel Whiting (calcium carbonate filler), 1.7 parts of sulfur, 0.75 part of rubber accelerator (91% zinc salt of mercaptobenzothiazole and 9% N,N'-di(o-tolyl) guanidine) and 5.0 parts of "Circo Oil" (light processing mineral oil) is milled into the milled crepe rubber over a period of 15 minutes on a rubber mill at room temperature. When the material is well and completely mixed into a homogeneous plastic mass, 2.0 parts of 1-aminocyclohexanecarboxylic acid N-carboanhydride is milled into the mixture over a period of 10 minutes on a rubber mill at room temperature. After the 1-aminocyclohexanecarboxylic acid N-carboanhydride is thoroughly incorporated into the plastic mass, the well-milled material is sheeted out at a thickness of 166 mils, a two-inch disk is cut from the sheet, placed in a circular confined space ½" thick, heated at 150° C. for 20 minutes. Upon removal, the rubber disk is found to be blown to the depth dimensions of the confined space, i. e., the disk of the rubber composition increased from 166 to 500 mils (a three-fold increase, or 3:1 blow) in thickness while still maintaining its original circular dimensions. A cross section of the sponge rubber so produced is found to have small, even, well-spaced pores.

EXAMPLE III

A. *Preparation of 5,5-hexamethylenespirohydantoin*

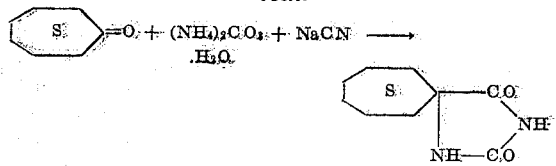

This preparation is carried out in general as described under Example I, Part A, except that 40 g. (0.3 mole) of cycloheptanone (suberone), 80 g. (0.6 mole) of ammonium carbonate monohydrate, 110 mls. of 95% ethyl alcohol, 70 mls. of water, 14.1 g. (0.28 mole) of 97% sodium cyanide in 50 mls. of water are used. There is thus obtained 27 g. (53% of theory) of 5,5-hexamethylenespirohydantoin as snow white crystals melting at 216°–216.5° C.

ANALYSIS

Calculated for $C_9H_{14}O_2N_2$: C, 59.32%; H, 7.74%; N, 15.38%.
Found:
C, 59.39%; H, 7.83%; N, 15.15%
59.20%; 7.65%; 15.12%

B. *Preparation of 1-aminocycloheptanecarboxylic acid*

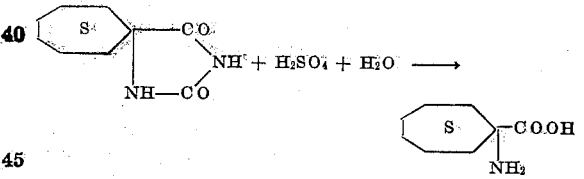

This preparation is carried out in general in the same fashion as described in Example I, Part B, except that 18.2 g. (0.1 mole) of 5,5-hexamethylenespirohydantoin and 45 g. (0.3 mole) of 60% sulfuric acid are used and the reflux time under nitrogen is 41 hours. There is thus obtained 10 grams (64% of theory) of 1-aminocycloheptanecarboxylic acid as glistening, white platelets.

ANALYSIS

Calculated for $C_8H_{15}O_2N$: C, 61.12%; H, 9.62%; N, 8.91%.
N. E., 157.2
Found:
C, 61.17%; H, 6.69%; N, 8.68%
60.86%; 9.65%; 8.67%
N. E., 156.7; 156.5

The acid has also been prepared by another method. See Zelinsky et al, supra.

C. *Preparation of the N-carboanhydride of 1-aminocycloheptanecarboxylic acid*

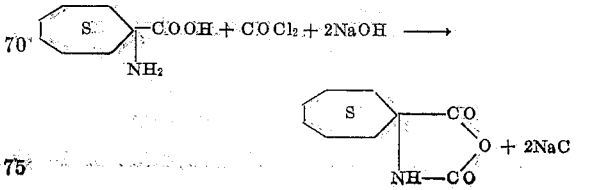

A solution of 3.14 g. (0.02 mole) of 1-aminocycloheptanecarboxylic acid in 20 mls. (0.02 mole) of 1.013 N sodium hydroxide is placed in a cylindrical glass reactor and cooled to 0° C. in an ice bath. Phosgene is bubbled into the reaction mixture for 2 minutes at the rate of 0.02 mole per minute (100% excess). A voluminous precipitate is obtained within 14 seconds and the temperature of the reaction mixture rises to 11° C. The almost solid reaction mixture is extracted with 100 mls. of chloroform which dissolves a large portion of the solid. The chloroform extract is washed with water, treated with anhydrous calcium sulfate for 30 minutes, and the solvent then removed under reduced pressure. There is thus obtained 0.7 gram (19% of theory) of the N-carboanhydride of 1-aminocycloheptanecarboxylic acid melting at 145-146° C. Upon recrystallization from 10 mls. of warm benzene to which is added 25 mls. of warm petroleum ether, there is obtained after cooling and standing 0.35 g. (10% of theory) of the purified N-carboanhydride of 1-aminocycloheptanecarboxylic acid melting at 146-147° C.

ANALYSIS

Calculated for $C_9H_{13}O_3N$: C, 59.00%; H, 7.15%; N, 7.65%

Found: C, 59.01%; H, 7.15%, N, 7.79%

The chloroform- and water-insoluble residues remaining from the chloroform extraction are taken up in 20 mls. of sodium hydroxide, cooled in ice, and phosgene is passed into the resultant solution for 2 minutes at 0.01 mole per minute. Chloroform extraction of the resultant reaction mixture, followed by removal of the chloroform solvent at reduced pressure produced an additional 0.2 g. of the N-carboanhydride of 1-aminocycloheptanecarboxylic acid as white crystals melting at 144-145° C., thus increasing the yield of the N-carboanhydride to 25% of theory.

EXAMPLE IV

Fifteen (15) parts of the sodium salt of 1-amino - x - methylcyclohexanecarboxylic acid (prepared from mixed 1-amino-x-methylcyclohexanecarboxylic acid which in turn was prepared from a mixture of methylcyclohexanones) in an open reaction vessel protected from the atmosphere by drying tubes was covered with excess liquid phosgene, while the vessel was being cooled in a solid carbon dioxide/acetone bath. The reaction vessel was then removed to an ice bath and allowed to remain under such conditions overnight. The excess phosgene was removed by distillation; the solid product remaining was triturated with chloroform; the resulting slurry of sodium chloride and choloroform was filtered, and the chloroform removed by distillation of the filtrate, all under anhydrous oxygen-free conditions. There was obtained 5.4 parts (37% of theoretical) of white N-carboanhydride of 1 - amino-x-methylcyclohexanecarboxylic acid which sintered at 115-125° C. and melted with foaming at 160-170° C. A fresh sample immersed in a 170° C. bath melted sharply, decomposed with foaming, and became an opaque white solid in one minute.

The spiro N-carboanhydrides of this invention may be polymerized as shown in the following illustrative examples.

*Polymerization of the N-carboanhydride of 1-aminocyclopentanecarboxylic acid*

One (1) part of the N-carboanhydride of 1-aminocyclopentanecarboxylic acid is dissolved in eleven parts of anhydrous chlorobenzene and the resulting solution refluxed under anhydrous conditions for 57 hours. At the end of this time, 0.0003 part (0.05 mole per cent based on the N-carboanhydride) of cyclohexylamine is added as a polymerization initiator and the solution refluxed for an additional four days. At the end of this time, there is obtained an insoluble solid polymer of 1-aminocyclopentanecarboxylic acid, insoluble in xylene, cresol and chloroform, soluble in concentrated sulfuric acid and infusible at 350° C., showing no discoloration on a copper block exposed to the atmosphere at this temperature.

*Polymerization of the N-carboanhydride of 1-aminocyclohexanecarboxylic acid*

The N - carboanhydride of 1 - aminocyclohexanecarboxylic acid is heated under nitrogen in an open, tubular container to 160° C. After two minutes at this temperature, carbon dioxide begins to be evolved from the clear, colorless melt. Within 25 minutes the liquid begins to thicken, and within two hours it becomes opaque and finally solid. The polymeric product thus obtained is a powdery, white solid which is infusible at 400° C. It is soluble in concentrated sulfuric acid and insoluble in 98% formic acid, saturated calcium chloride/methanol solution, 50% lithium bromide solution, water, saturated calcium chloride/formic acid solution, 85% syrupy phosphoric acid, 4 N sodium hydroxide, and concentrated hydrochloric acid. This solubility behavior indicates it to have a high degree of polymerization.

When the above N-carboanhydride is heated at 146° C. polymer formation is greatly accelerated when 0.2% of tetramethylenediamine is included.

*Copolymer from the N-carboanhydrides of alpha-aminoisobutyric acid and 1-aminocyclohexanecarboxylic acid*

A mixture of two parts of the N-carboanhydride of alpha-aminoisobutyric acid and one part of the N-carboanhydride of 1-aminocyclohexanecarboxylic acid is heated under nitrogen to 160° C. in an open glass or glass-lined vessel. A clear melt is obtained almost at once. Within two minutes vigorous evolution of carbon dioxide sets in; with 25 minutes the liquid becomes so viscous that it begins to foam, and after 3½ hours it becomes solid. Heating is continued for a total time of 4½ hours. The polymer so obtained is a white, amorphous powder which is infusible and darkens only in spots after one minute at 400° C. It has a nitrogen content of 14.65%, as compared with the calculated value of 14.55%, and inherent viscosity of 0.13 and softens at 200° C., then hardens and becomes infusible finally decomposing at 320° C. This polymer gives a positive biuret test of lavender tint and is soluble in chloral hydrate, chloroform, m-cresol, phenol, and benzyl alcohol. It is swollen by benzene and cyclohexane and is insoluble in tertiary butanol, concentrated hydrochloric acid, 98% formic acid, and water. End-group titrations indicate an amino content of $330 \times 10^{-6}$ per gram of polymer. This indicates a molecular weight of about 3000 and a degree of polymerization (DP) of 27. Infra-red absorption diagrams show the absence of diketopiperazine-type structures.

Copolymer from the N-carboanhydrides of dl-beta-phenylalanine and 1-aminocyclohexanecarboxylic acid A mixture of three parts each of the N-carboanhydrides of dl-beta-phenylalanine and 1-aminocyclohexanecarboxylic acid is heated under nitrogen at 146° C. Vigorous evolution of carbon dioxide occurs at once in the clear melt. After heating for ten minutes at about 150° C., extensive foaming sets in; the melt then thickens and within 35 minutes it solidifies. Heating is terminated after a total time of 80 minutes. The white, powdery polymer obtained is soluble in chloroform, hot benzene, and m-cresol, softens at 160° C. and has an inherent viscosity of 0.09. A clear, colorless, self-supporting film was obtained by pressing at 240° C. under 5000 p. s. i. pressure.

Copolymer from the N-carboanhydrides of glycine and 1-aminocyclohexanecarboxylic acid Two parts of the N-carboanhydride of glycine and one part of the N-carboanhydride of 1-aminocyclohexanecarboxylic acid are ground together in a mortar and then heated under nitrogen at 121° C. for five hours. The mixture sinters at the start but does not melt. The product is insoluble in boiling m-cresol and is infusible on a copper block, charring at 320° C.

Copolymer from the N-carboanhydrides of 1-aminocyclohexanecarboxylic acid and alpha-aminocyclohexylacetic acid A mixture of equal parts of the N-carboanhydrides of 1-aminocyclohexanecarboxylic acid and alpha - aminocyclohexylacetic acid is heated under nitrogen at 146° C. Vigorous evolution of carbon dioxide occurs almost at once in the clear melt (after 1 to 2 minutes' heating). After ten to fifteen minutes' heating evolution of carbon dioxide ceases and the melt becomes solid. Heating is terminated after one hour. The white, powdery polymer obtained is soluble in m-cresol, softens at 180° C. and exhibits an inherent viscosity of 0.09.

Polymerization of the N-carboanhydride of 1-aminocycloheptanecarboxylic acid Two-tenths (0.2 part of N-carboanhydride of 1-aminocycloheptanecarboxylic acid in 4.4 parts of anhydrous chlorobenzene is refluxed under anhydrous conditions for two days. There is thus obtained a white, solid polymer of 1-aminocycloheptanecarboxylic acid insoluble in m-cresol, chloroform, xylene, chlorobenzene, soluble in concentrated sulfuric acid and infusible at 350° C., showing no discoloration on a copper block exposed to the atmosphere at this temperature.

The present invention is generic to N-carboanhydrides of alpha-amino acids wherein the 4-carbon of the carboanhydride or oxazolidine ring is a spiro carbon, i. e., the 4-carbon is the one annular member common to two rings. The size of the second ring, i. e., the ring other than the oxazolidine ring, is immaterial, but it will normally have from 5 to 7, and preferably 6, members since others are rare and difficultly formed. Such ring is preferably carbocyclic, but it may be heterocyclic, in which case the hetero atoms may be oxygen, nitrogen, or sulfur; also, it may have substituents such as halogen, alkyl, alkoxy, and the like which are non-reactive in the polymer-forming condensation.

In addition to the acid of the examples, there may be employed, with formation of the corresponding N-carboanhydrides, 3-aminotetrahydrothiophene - 3 - carboxylic acid, 4 - amino-1-methyl-piperidine-4-carboxylic acid, 3-aminotetrahydrofuran-3-carboxylic acid, 1-amino-2-methylcyclobutanecarboxylic acid, 1-amino-2-methylcyclohexanecarboxylic acid, 1-amino-3-methylcyclohexanecarboxylic acid, 1-amino-4-methylcyclohexanecarboxylic acid, 1 - amino-3,3,5 - trimethylcyclohexanecarboxylic acid, 1-aminocyclopentanecarboxylic acid, 1-aminocycloheptanecarboxylic acid, and 1-amino-4-nitrocyclohexanecarboxylic acid.

The N-carboanhydrides of this invention may be systematically described as 2,5-diketooxazolidines having the 4-carbon of the carboanhydride or oxazolidine ring a spiro carbon, i. e., the one common member of two rings.

The N-carboanhydrides of this invention exhibit marked superiority in heat stability over the known N-carboanhydrides of amino acids. This superiority reduces the difficulty of isolation and handling, and it enhances their utility as polyamide intermediates since it is carried into the resulting polymers even though higher temperatures may be required for elimination of carbon dioxide. The N-carboanhydrides of this invention are thus useful in the preparation of polyamides and copolyamides through polymerization, via carbon dioxide evolution, with themselves or other N-carboanhydrides. The N-carboanhydrides are also useful as bactericidal agents.

The polymers obtained from the N-carboanhydrides of the present invention, including the above-mentioned specific N-carboanhydrides are linear condensation polyamides characterized by recurring alpha-amino acid units 30 to 100% of which are units wherein the alpha-carbon is a member of a ring preferably of 5 to 7 members and preferably carbocyclic which ring is, apart from said alpha-carbon, external to the polymer chain.

These polymers are prepared optionally in the presence of an organic solvent, by the condensation polymerization (thermal or initiated by water, ethanol, phenols, organic acids, or amino hydrogen-containing amines), with carbon dioxide evolution, of compositions all of the reactants of which are amino acid N-carboanhydrides and which contain from 30 to 100%, by weight of the reactants, of one or more alpha-amino acid N-carboanhydrides having the 4-carbon of the N-carboanhydride or oxazolidine ring a spiro carbon, i. e., the one common member of two rings. The spiro N-carboanhydride must make up at least 30% of the polymerizable components in order that the polymer may exhibit in effective measure the unique properties of the polymers of this invention.

The preferred procedure is to heat the selected spiro amino acid N-carboanhydride-containing composition under oxygen-free conditions, desirably under an inert gas such as nitrogen or carbon dioxide, in a vessel adapted to permit escape of carbon dioxide, to that temperature at which carbon dioxide is evolved at an appreciable rate. This varies somewhat with different compounds but is usually in the neighborhood of 70–200° C., and is generally above the melting point of the spiro amino acid N-carboanhydrides. Heating is continued until carbon dioxide evolution ceases with the temperature maintained at the gas evolution point or slightly, 10–20° C., above it. The time of the reaction may be shortened or the temperature necessary may be lowered, or both, by the use of catalysts for the decomposition of the N-carboanhydrides, such as water, ethanol, phenols, organic acids such as adipic, or amino-hydrogen-containing amines such as tetramethylenediamine.

Polymers from the N-carboanhydrides of this invention exhibit marked thermal stability over the previously known amino acid polyamides; thus, they do not decompose at temperatures as high as 350–400° C. Their solubility in organic solvents varies considerably, ranging from high insolubility when a single N-carboanhydride is employed to fairly wide solubilities as the amount of other amide-forming ingredient is increased, although there are some exceptions to the latter generality. The insoluble types may be used as fillers, delusterants for nylon, and pigment carriers. The soluble types may be used to produce films and artificial fibers. The interpolyamides prepared from N-carboanhydrides of this invention are soluble in one or more of the following: sulfuric acid; hot benzene; chloral hydrate; tetralin; five and six-membered alicyclic ketones liquid below 75° C., e. g. cyclopentanone and cyclohexanone; halogenated hydrocarbons liquid below 75° C., e. g. methylene chloride, chloroform, carbon tetrachloride, ethylene dichloride, allyl iodide, benzyl chloride, and chlorobenzene; and phenols and thiophenols liquid below 75° C., e. g. phenol, chlorophenol, thiophenol, resorcinol monomethylether, and m-cresol.

The term "inherent viscosity" or $\eta_{inh.}$ as used herein is defined by the following equation:

$$\eta_{inh.} = \frac{\ln \eta_{rel.}}{C}$$

where $\ln$ represents the natural, or Napierian, logarithm, C is concentration of solute in grams per 100 cc. of solution, and $$\eta_{rel.} = \frac{\eta_{solution}}{\eta_{solvent}}$$

$\eta$ being viscosity. In this specification inherent viscosity data refer to results obtained with the polyamide involved dissolved in m-cresol at a concentration of 0.5 gram per 100 cc. of solution at 25° C.

The foregoing detailed description has been given for clearness of understanding only and no unnecessary limitations are to be understood therefrom. The invention is not limited to the exact details shown and described for obvious modifications will occur to those skilled in the art.

What is claimed is:

1. An N-carboanhydride of an alpha-amino acid in which carboanhydride the 4-carbon of the oxazolidine ring is a spiro carbon of a five to seven atom ring.

2. An N-carboanhydride of an alpha-amino acid in which carboanhydride the 4-carbon of the oxazolidine ring is a spiro carbon, the second ring being carbocyclic and of 5 to 7 carbons.

3. An N-carboanhydride of an alpha-amino acid in which carboanhydride the 4-carbon of the oxazolidine ring is a spiro carbon, the second ring being a six-membered carbocyclic ring.

4. An N-carboanhydride of an alpha-amino acid in which carboanhydride the 4-carbon of the oxazolidine ring is a spiro carbon, the second ring being a five-membered carbocyclic ring.

5. An N-carboanhydride of an alpha-amino acid in which carboanhydride the 4-carbon of the oxazolidine ring is a spiro carbon, the second ring being a seven-membered carbocyclic ring.

6. An N-carboanhydride of an alpha-amino acid in which carboanhydride the 4-carbon of the oxazolidine ring is a spiro carbon, the second ring being carbocyclic, hydrocarbon, and of 5 to 7 carbons.

7. An N-carboanhydride, containing only carbon, hydrogen, the N-carboanhydride nitrogen, and the three N-carboanhydride oxygens, of an alpha-amino acid in which carboanhydride the 4-carbon of the oxazolidine ring is a spiro carbon, the second ring being a five-membered carbocyclic ring.

8. An N-carboanhydride, containing only carbon, hydrogen, the N-carboanhydride nitrogen, and the three N-carboanhydride oxygens, of an alpha-primary amino acid in which carboanhydride the 4-carbon of the oxazolidine ring is a spiro carbon, the second ring being a five-membered carbocyclic ring.

9. An N-carboanhydride, containing only carbon, hydrogen, the N-carboanhydride nitrogen, and the three N-carboanhydride oxygens, of an alpha-amino acid in which carboanhydride the 4-carbon of the oxazolidine ring is a spiro carbon, the second ring being a seven-membered carbocyclic ring.

10. An N-carboanhydride, containing only carbon, hydrogen, the N-carboanhydride nitrogen, and the three N-carboanhydride oxygens, of an alpha-primary amino acid in which carboanhydride the 4-carbon of the oxazolidine ring is a spiro carbon, the second ring being a seven-membered carbocyclic ring.

11. An N-carboanhydride, containing only carbon, hydrogen, the N-carboanhydride nitrogen, and the three N-carboanhydride oxygens, of an alpha-amino acid in which carboanhydride the 4-carbon of the oxazolidine ring is a spiro carbon, the second ring being a six-membered carbocyclic ring.

12. An N-carboanhydride, containing only carbon, hydrogen, the N-carboanhydride nitrogen, and the three N-carboanhydride oxygens, of an alpha-primary amino acid in which carboanhydride the 4-carbon of the oxazolidine ring is a spiro carbon, the second ring being a six-membered carbocyclic ring.

13. An N-carboanhydride, containing only carbon, hydrogen, the N-carboanhydride nitrogen, and the three N-carboanhydride oxygens, of an alpha-amino acid in which carboanhydride the 4-carbon of the oxazolidine ring is a spiro carbon, the second ring being carbocyclic, hydrocarbon, and of 5 to 7 carbons.

14. An N-carboanhydride, containing only carbon, hydrogen, the N-carboanhydride nitrogen, and the three N-carboanhydride oxygens, of an alpha-primary amino acid in which carboanhydride the 4-carbon of the oxazolidine ring is a spiro carbon, the second ring being carbocyclic, hydrocarbon, and of 5 to 7 carbons.

15. The N-carboanhydride of 1-aminocyclopentanecarboxylic acid.

16. The N-carboanhydride of 1-aminocyclohexanecarboxylic acid.

17. The N-carboanhydride of 1-aminocycloheptanecarboxylic acid.

18. The N-carboanhydride of 1-aminomethylcyclohexanecarboxylic acid.

ROBERT NEAL MacDONALD.

REFERENCES CITED

The following references are of record in the file of this patent:

UNITED STATES PATENTS

| Number | Name | Date |
| --- | --- | --- |
| 2,327,162 | Baldwin et al. | Aug. 17, 1943 |
| 2,389,662 | Fisher et al. | Nov. 27, 1945 |

Certificate of Correction

Patent No. 2,560,584 July 17, 1951

ROBERT NEAL MacDONALD

It is hereby certified that error appears in the printed specification of the above numbered patent requiring correction as follows:

Column 1, line 8, strike out ", now abandoned,"; line 9, after "1947" and before the period insert , *now abandoned*; column 2, line 31, for "50.04%" read *54.04%*; column 6, line 60, for "6.69%" read *9.69%*; line 74, for that portion of the formula reading "+2NaC" read *+2NaCl*;

and that the said Letters Patent should be read as corrected above, so that the same may conform to the record of the case in the Patent Office.

Signed and sealed this 2nd day of October, A. D. 1951.

[SEAL]

THOMAS F. MURPHY,
*Assistant Commissioner of Patents.*